(12) United States Patent
Ahn et al.

(10) Patent No.: US 11,441,751 B2
(45) Date of Patent: Sep. 13, 2022

(54) VEHICLE GRILLE

(71) Applicants: HYUNDAI MOTOR COMPANY, Seoul (KR); KIA CORPORATION, Seoul (KR); SL Corporation, Daegu (KR)

(72) Inventors: Byoung Suk Ahn, Gwacheon-si (KR); Jung Wook Lim, Seoul (KR); Ki Hong Lee, Seoul (KR); Seung Sik Han, Hwaseong-si (KR); Dong Hyun Go, Gyeongsan-si (KR); Jung Hee Seo, Gyeongsan-si (KR); Kyeong Jin Ahn, Gyeongsan-si (KR)

(73) Assignees: HYUNDAI MOTOR COMPANY, Seoul (KR); KIA CORPORATION, Seoul (KR); SL CORPORATION, Seoul (KR)

( * ) Notice: Subject to any disclaimer, the term of this patent is extended or adjusted under 35 U.S.C. 154(b) by 0 days.

(21) Appl. No.: 17/341,883

(22) Filed: Jun. 8, 2021

(65) Prior Publication Data

US 2022/0107071 A1 Apr. 7, 2022

(30) Foreign Application Priority Data

Oct. 6, 2020 (KR) ........................ 10-2020-0129042

(51) Int. Cl.
*F21S 41/55* (2018.01)
*B60Q 1/28* (2006.01)
(Continued)

(52) U.S. Cl.
CPC ............ *F21S 41/55* (2018.01); *B60Q 1/2661* (2013.01); *B60Q 1/28* (2013.01); *B60R 19/52* (2013.01)

(58) Field of Classification Search
CPC ...... B60R 19/52; B60R 2019/522–527; B60Q 1/56; B60Q 1/50–5035; F21S 41/50–55
See application file for complete search history.

(56) References Cited

U.S. PATENT DOCUMENTS

| | | | |
|---|---|---|---|
| 9,586,518 B2 | 3/2017 | Salter et al. | |
| 9,714,749 B1 | 7/2017 | Salter et al. | |

(Continued)

FOREIGN PATENT DOCUMENTS

| | | | | |
|---|---|---|---|---|
| CN | 112124239 A | * | 12/2020 | ........... B60Q 1/2661 |
| GB | 2501781 A | * | 11/2013 | ........... B60Q 1/2661 |

(Continued)

*Primary Examiner* — Mariceli Santiago
(74) *Attorney, Agent, or Firm* — Lempia Summerfield Katz LLC

(57) ABSTRACT

A vehicle grille includes: a grille panel; a lens panel disposed at a rear side of the grille panel, formed in a same shape as some or entire area of the grille panel, and, when a light is incident, configured to allow some of the light to propagate in the lens panel and emit some of the light to an outside of the lens panel; and a housing disposed on a rear surface of the lens panel, formed in a same shape as the lens panel, and including a coupling provision end portion configured to allow a front surface of the lens panel to be coupled to a rear surface of the grille panel at a front side of the lens panel, wherein the rear surface of the lens panel and a front surface of the housing are coupled at the front side of the lens panel.

14 Claims, 10 Drawing Sheets

(51) Int. Cl.
*B60R 19/52* (2006.01)
*B60Q 1/26* (2006.01)

(56) References Cited

U.S. PATENT DOCUMENTS

| | | | |
|---|---|---|---|
| 10,214,140 B2 * | 2/2019 | Belcher | G02B 6/0041 |
| 10,281,113 B1 * | 5/2019 | Salter | B60R 19/483 |
| 2013/0293104 A1 * | 11/2013 | Wu | B60Q 1/2661 |
| | | | 315/77 |
| 2018/0272927 A1 * | 9/2018 | Moore | B60Q 1/2661 |
| 2020/0262377 A1 * | 8/2020 | Salter | B60R 19/52 |

FOREIGN PATENT DOCUMENTS

| | | | |
|---|---|---|---|
| KR | 20-0323272 Y | 8/2003 | |
| KR | 10-2017-0062405 | 6/2017 | |
| WO | WO-2018073678 A1 * | 4/2018 | B60Q 1/2661 |
| WO | WO-2020057675 A1 * | 3/2020 | B60Q 1/2661 |
| WO | WO-2020212072 A1 * | 10/2020 | B60Q 1/2661 |

* cited by examiner

VEHICLE GRILLE

CROSS REFERENCE TO RELATED APPLICATION

The present application claims priority to and the benefit of Korean Patent Application No. 10-2020-0129042, filed on Oct. 6, 2020, the entire contents of which are incorporated herein by reference.

FIELD

The present disclosure relates to a vehicle grille.

BACKGROUND

The statements in this section merely provide background information related to the present disclosure and may not constitute prior art.

A radiator grille for aerodynamics and engine cooling is provided in a front portion of a vehicle, and even when a vehicle is not an internal combustion engine vehicle, a grille is applied for a design component of the front portion of the vehicle.

The grille is a very important factor in designing the front portion of the vehicle, and light is irradiated through the grille to upgrade the grille and improve marketability of the vehicle.

Conventionally, in order to emit light from a grille, a lighting is installed behind the grille to emit light to a front side of the grille, but we have discovered that an installation space for a light source is desired.

In addition, when the grille is manufactured and parts forming the grille are coupled, work convenience is degraded because a coupling should be performed at a different position for each part.

The foregoing is intended merely to aid in understanding of the background of the present disclosure, and is not intended to mean that the present disclosure falls within the purview of the related art that is already known to those skilled in the art.

SUMMARY

The present disclosure provides a vehicle grille in which light is turned on and is softly spread from a rear side of the grille so that the grille is upgraded. In addition, the present disclosure provides a vehicle grille in which an easy coupling is provided when each of parts forming the vehicle grille is coupled.

In one form, there is provided a vehicle grille including: a grille panel configured to form a design of a grille; a lens panel disposed at a rear side of the grille panel, formed in the same shape as some or entire area of the grille panel, and configured to allow light to propagate in the lens panel when the light is incident and emit some of the light to the outside; and a housing including a coupling provision end portion, disposed on a rear surface of the lens panel, formed in the same shape as the lens panel, and configured to allow the grille panel to be coupled to a front surface of the lens panel in a state in which the lens panel is coupled to a front surface of the housing, wherein the rear surface of the lens panel and the front surface of the housing are coupled at a front side of the lens panel, and the front surface of the lens panel and the rear surface of the grille panel are coupled at the front side of the lens panel through a coupling provision end portion of the housing.

A laser may be emitted from the front side to a rear side so that the grille panel, the lens panel, and the housing may be coupled such that the grille panel and the housing are fused to the front surface and the rear surface of the lens panel.

In the housing, a frame portion may be coupled to a rim of the lens panel, the coupling provision end portion may extend from the frame portion, and the coupling provision end portion may be divided into an overlapping section which overlaps the grille panel at the front side and a non-overlapping section which does not overlap the grille panel.

The coupling provision end portion may obliquely extend from the frame portion to the rear side to form an inclined surface so that the laser being incident from the front side may be reflected through the inclined surface to propagate to the rear surface of the grille panel.

In the coupling provision end portion, the non-overlapping section of the inclined surface on which the laser is incident may undergo surface treatment to increase reflectance of a corresponding section.

A portion in which the grille panel is disposed may be curved to the rear side to form a bending portion in the lens panel, a fusing portion matched to the bending portion of the lens panel and seated on the bending portion may be formed in the grille panel, and the coupling provision end portion of the housing may obliquely extend from the frame portion to the rear side and may be obliquely formed to allow the laser being incident from the front side to propagate to a fusing portion of the grille panel.

The coupling provision end portion may extend to have a parabolic curve in the frame portion to form a curved surface so that the laser being incident from the front side may propagate toward the rear side of the grille panel.

In the coupling provision end portion, the non-overlapping section of the curved surface on which the laser is incident may undergo surface treatment to increase reflectance of a corresponding section.

A portion in which the grille panel is disposed may be curved to the rear side to form a bending portion in the lens panel, a fusing portion matched to the bending portion of the lens panel and seated on the bending portion may be formed in the grille panel, and the coupling provision end portion of the housing may extend to have a parabolic curve from the frame portion to the rear side and may be obliquely formed to allow the laser being incident from the front side to propagate to a fusing portion of the grille panel.

The coupling provision end portion may include a first reflective end portion located in the non-overlapping section and configured to extend from the frame portion to the rear side in a straight line with an inclination, and a second reflective end portion located in the overlapping section and configured to extend from the first reflective end portion to the front side in a straight line with an inclination so that the laser being incident from the front side may be reflected by the first reflective end portion to propagate to the second reflective end portion and then reflected by the second reflective end portion to propagate to the rear surface of the grille panel.

The first reflective end portion and the second reflective end portion may undergo surface treatment so that reflectance of corresponding sections may be high.

The coupling provision end portion may include a first curved end portion located in the non-overlapping section and configured to extend to have a parabolic curve from the frame portion to the rear side, and a second curved end portion located in the overlapping section and configured to extend to have a parabolic curve from the first curved end portion to the front side so that the laser being incident from the front side may be reflected by the first curved end portion to propagate to the second curved end portion and then reflected by the second curved end portion to propagate to the rear surface of the grille panel.

The first curved end portion and the second curved end portion may undergo surface treatment so that reflectance of corresponding sections may be high.

A length of one of the frame portions of the housing may be formed to be longer to the front end, and, when the lens panel and the housing are coupled, the frame portion extending longer may be coupled to the lens panel, and then the other frame portion may be coupled to the lens panel.

According to another form, a vehicle grille includes: a grille panel configured to constitute a design of a grille; a lens panel disposed at a rear side of the grille panel, formed in the same shape as some or entire area of the grille panel, and configured to allow light to propagate in the lens panel when the light is incident and emit some of the light to the outside; and a housing including a coupling provision hole, disposed on a rear surface of the lens panel, formed in the same shape as the lens panel, and configured to allow the grille panel to be coupled to a front surface of the lens panel in a state in which the lens panel is coupled to a front surface of the housing, wherein the rear surface of the lens panel and the front surface of the housing are coupled at a front side of the lens panel, and the front surface of the lens panel and the rear surface of the grille panel are coupled at the rear side of the lens panel through the coupling provision hole of the housing.

The housing may be coupled to the rear surface of the lens panel through a peripheral portion of the coupling provision hole, and the grille panel may be disposed to face the coupling provision hole of the housing and coupled to the front side of the lens panel.

In the housing, the peripheral portion of the coupling provision hole may be coupled to the rear surface of the lens panel, and the housing and the lens panel may be coupled by an extending end portion which extends from the rear surface of the lens panel toward the peripheral portion of the housing or extends from the peripheral portion of the housing toward the rear surface of the lens panel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
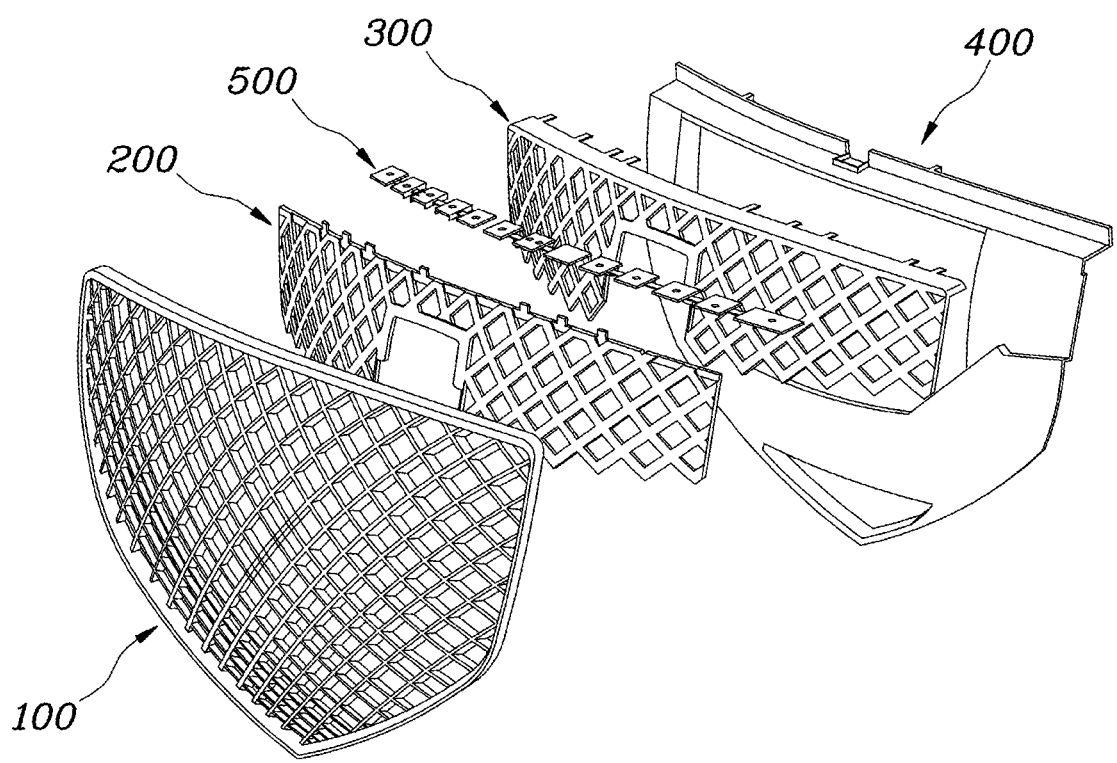
FIG. 1 is a diagram illustrating a vehicle grille according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
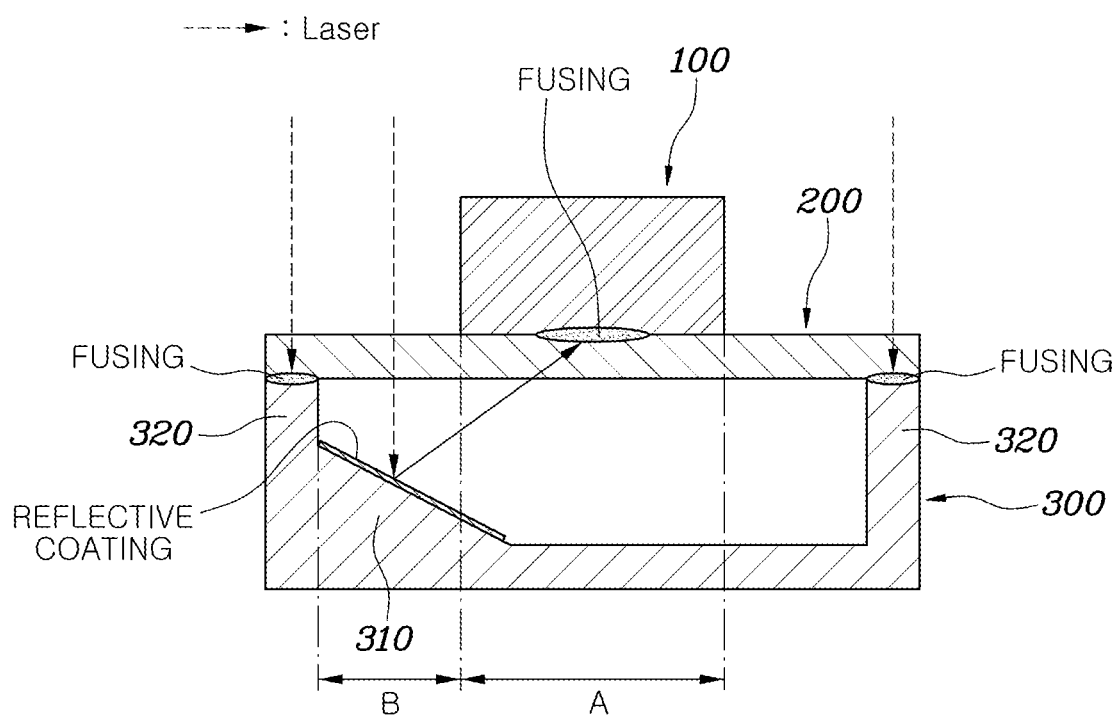
FIG. 2 is a diagram illustrating a coupling of a grille panel, a lens panel, and a housing of the vehicle grille shown in FIG. 1.
Figure 3:
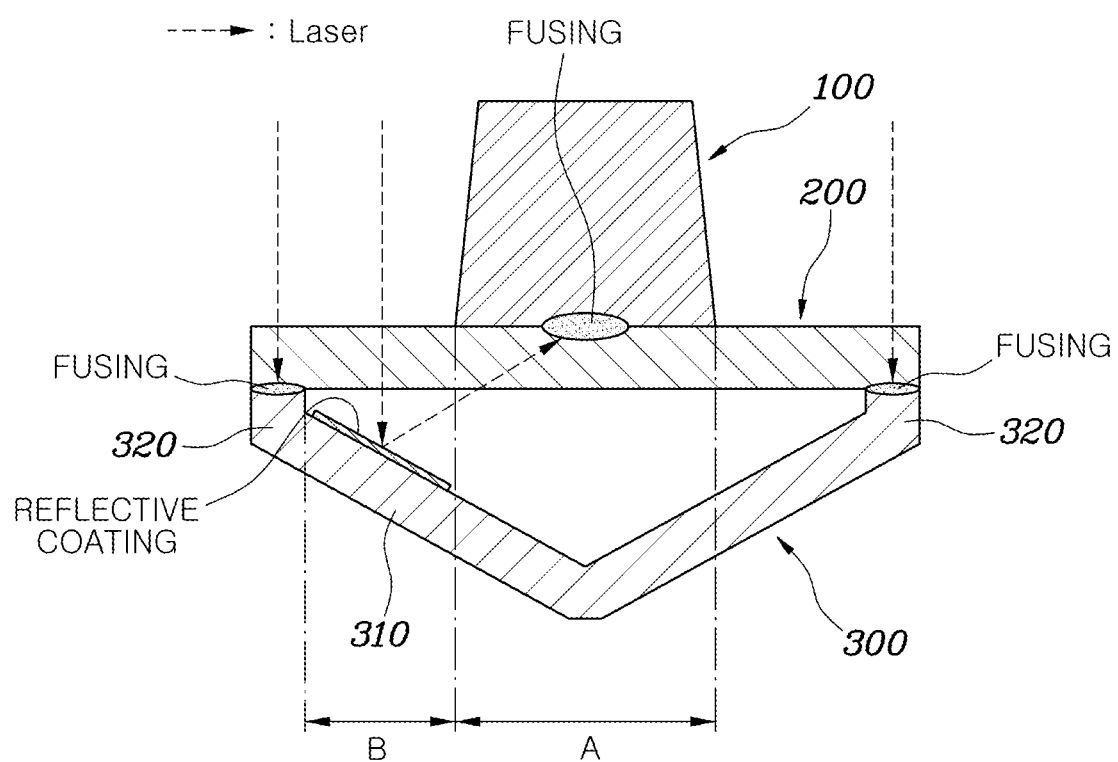
FIG. 3 is a diagram illustrating a first form of the present disclosure.
Figure 4:
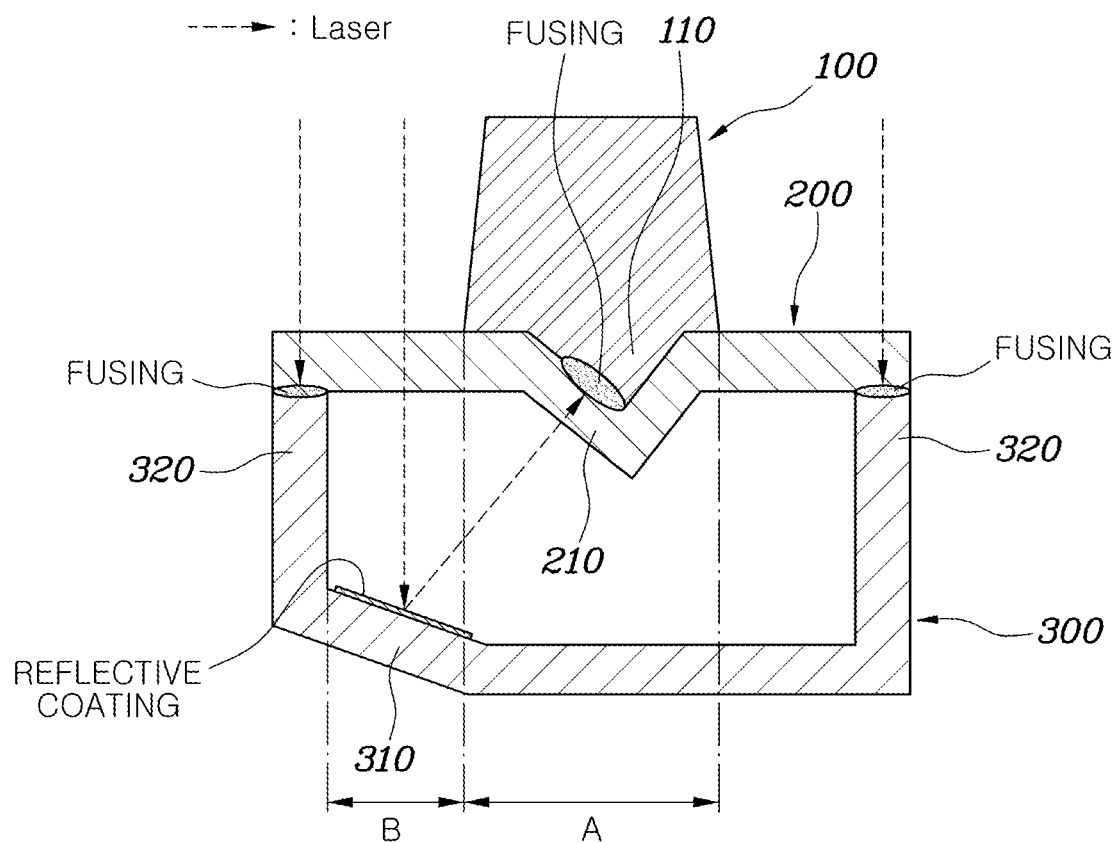
FIG. 4 is a diagram illustrating a second form of the present disclosure.
Figure 5:
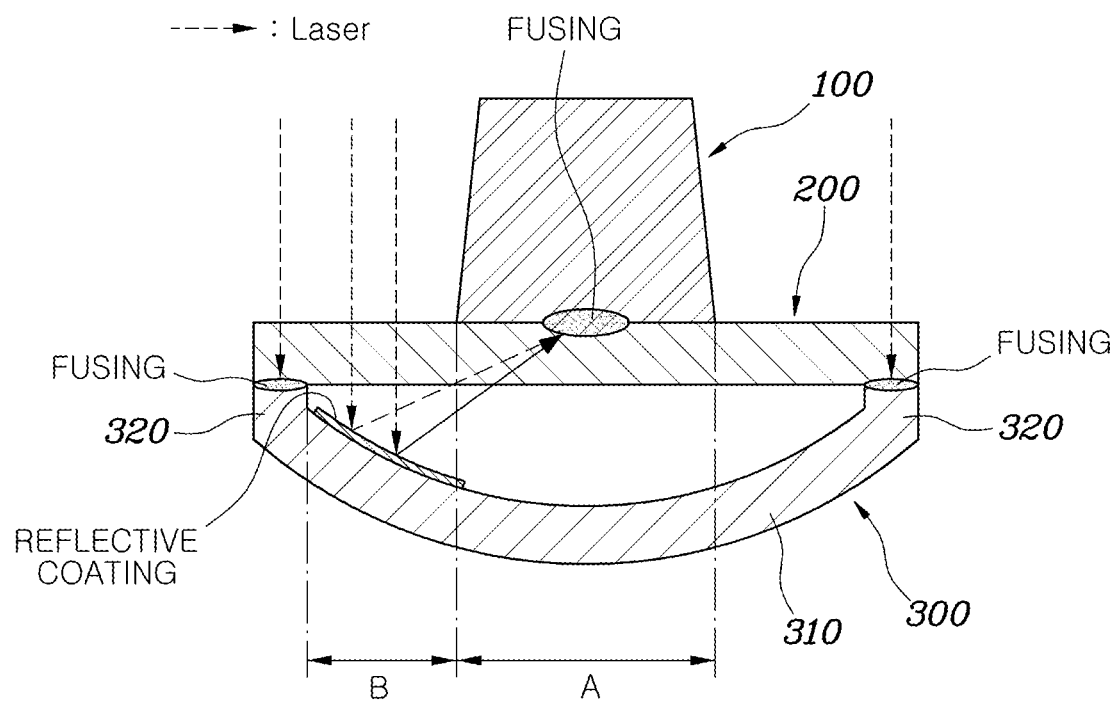
FIG. 5 is a diagram illustrating a third form of the present disclosure.
Figure 6:
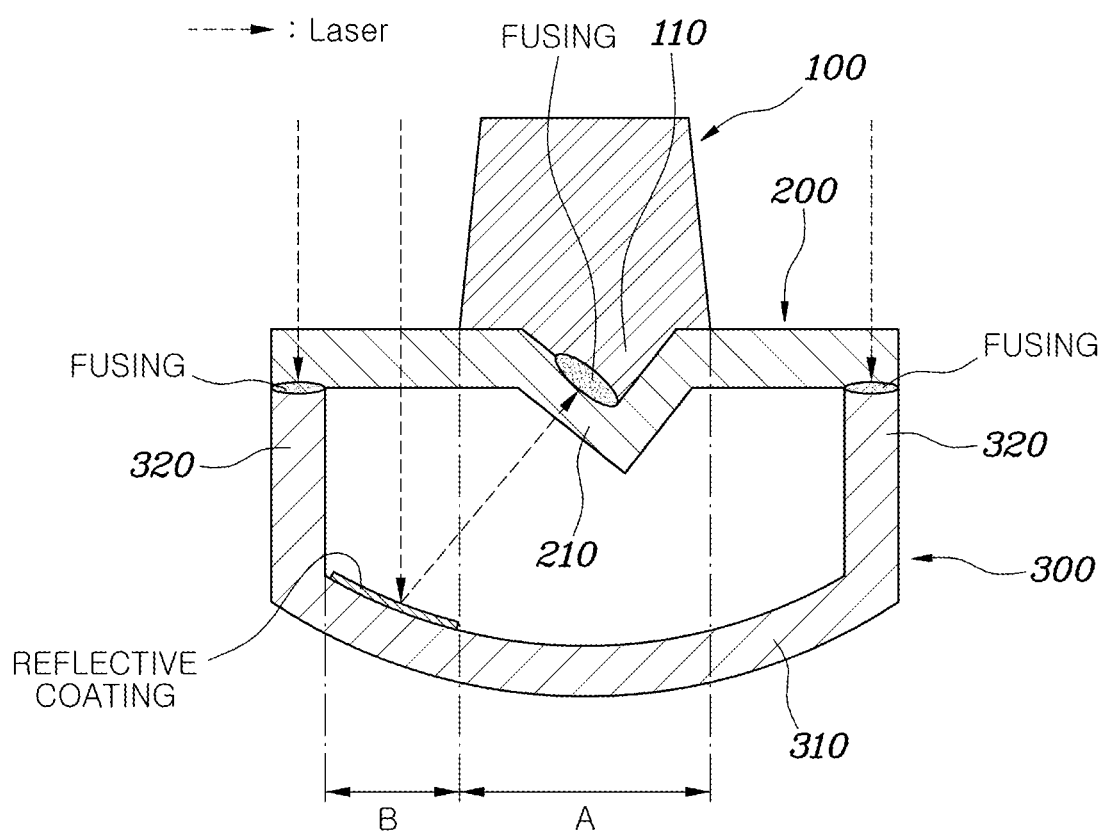
FIG. 6 is a diagram illustrating a fourth form of the present disclosure.
Figure 7:
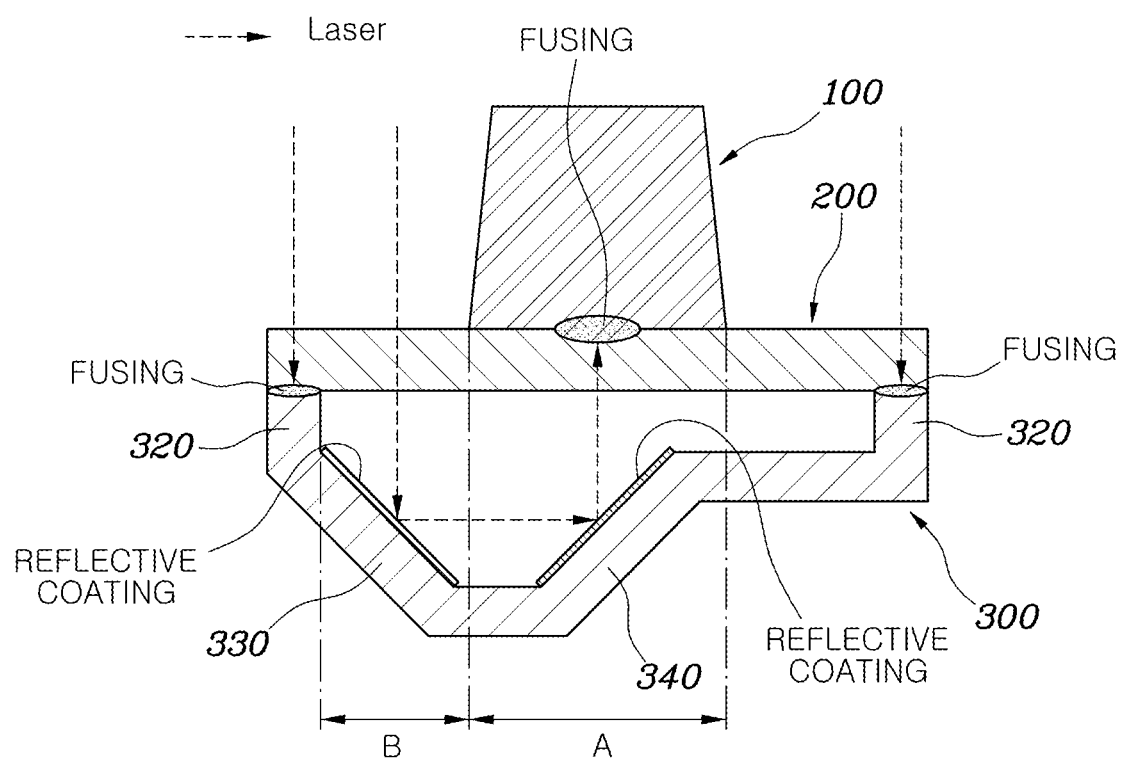
FIG. 7 is a diagram illustrating a fifth form of the present disclosure.
Figure 8:
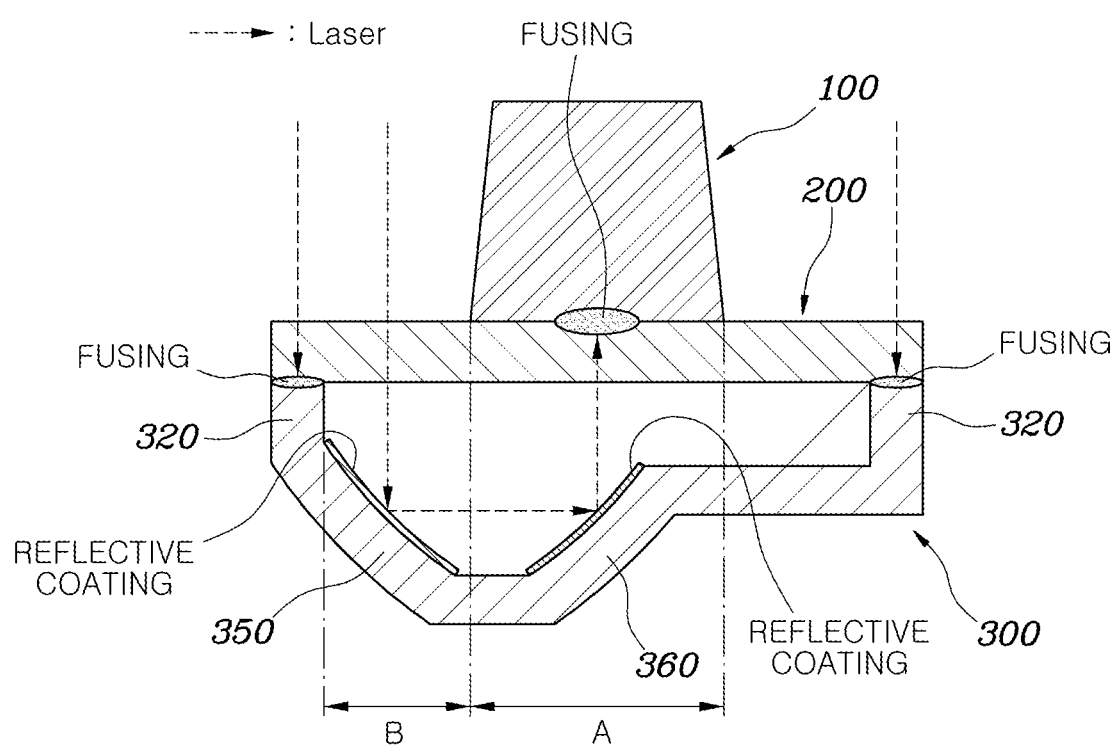
FIG. 8 is a diagram illustrating a sixth form of the present disclosure.
Figure 9:
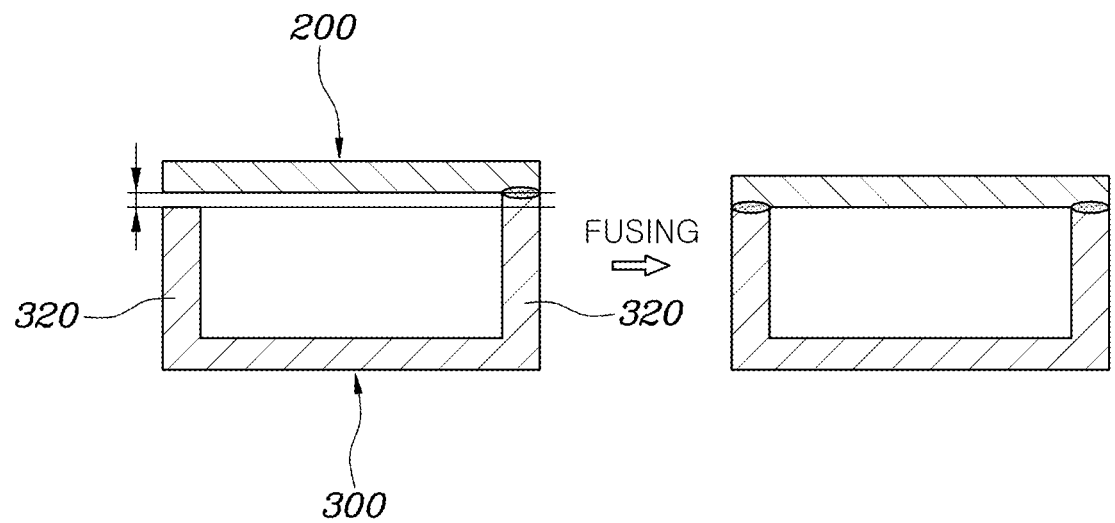
FIG. 9 is a diagram for describing a frame portion forming the housing of the present disclosure.
Figure 10:
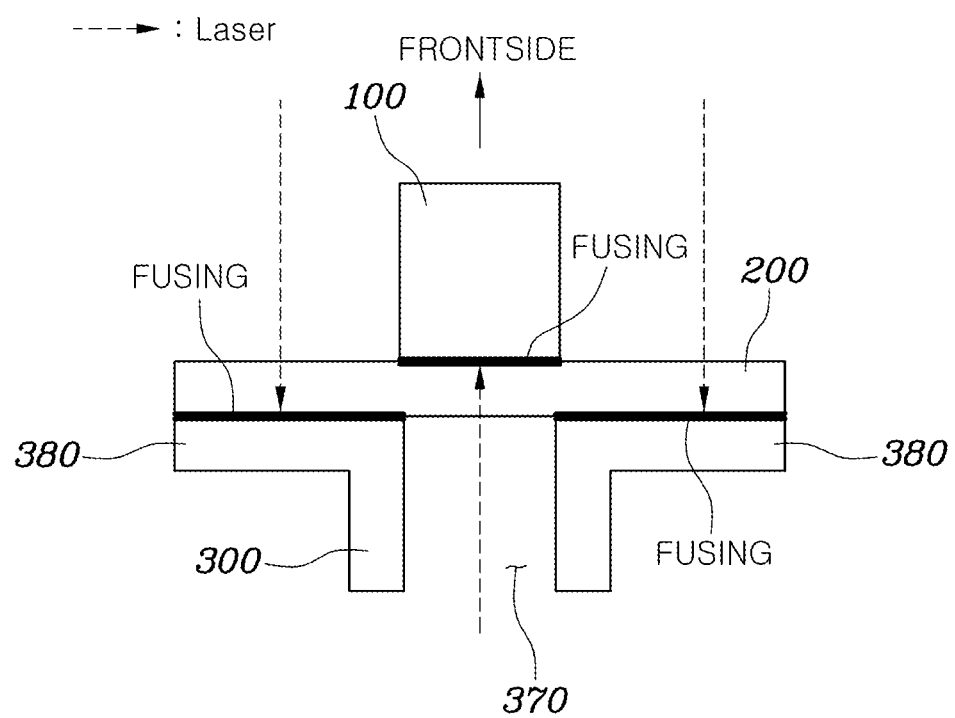
FIG. 10 is a diagram illustrating a coupling of a grille panel, a lens panel, and a housing of a vehicle grille according to another form of the present disclosure.
Figure 11:
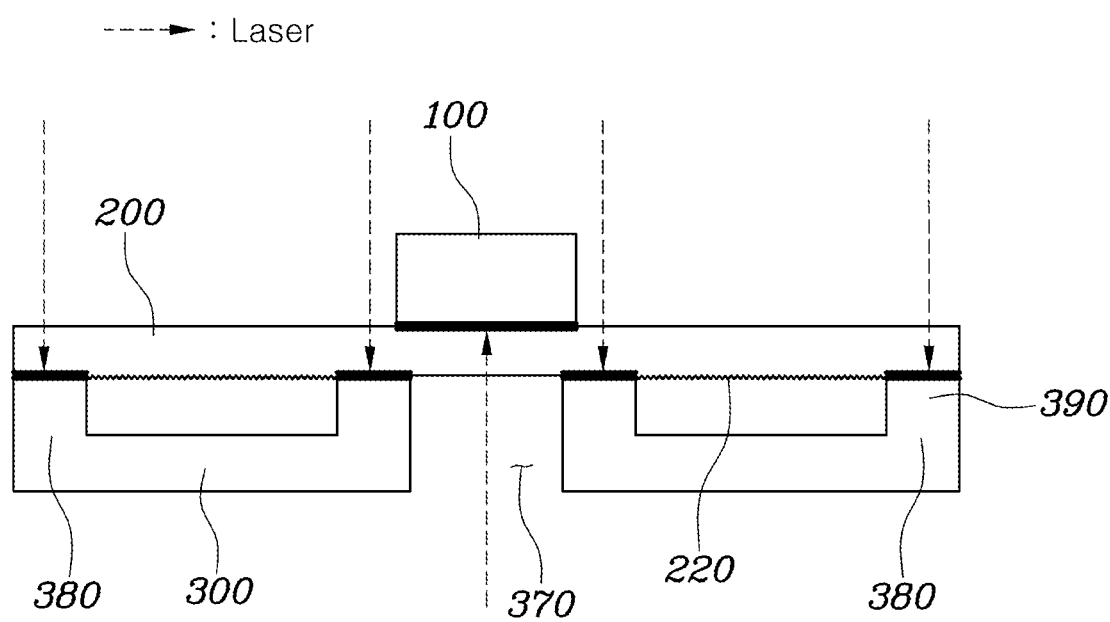
FIGS. 11 and 12 are diagrams illustrating a coupling of a grille panel, a lens panel, and a housing of a vehicle grille according to still another form of the present disclosure.
Figure 12:
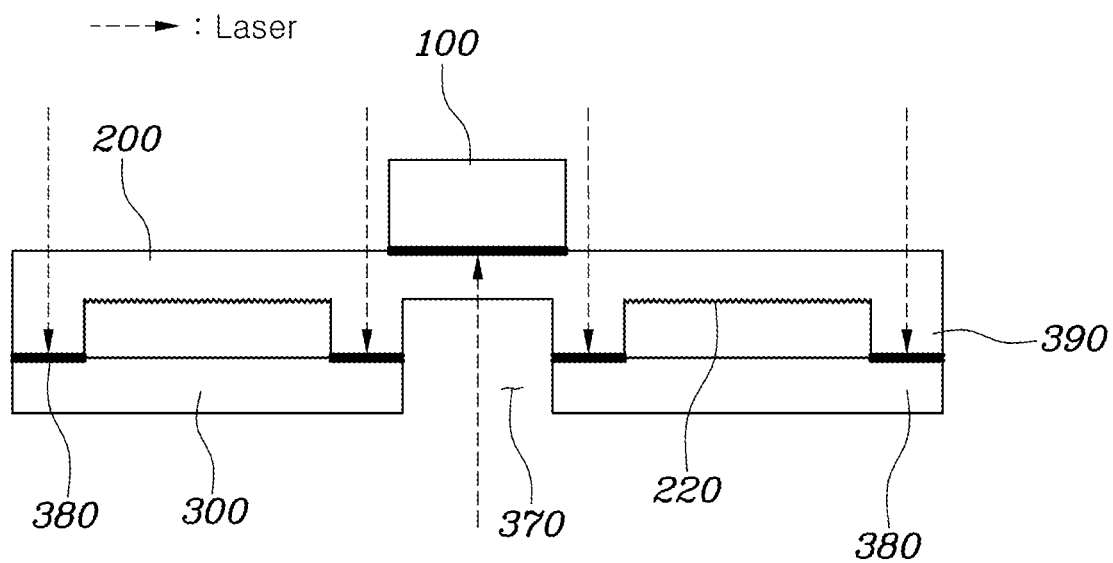

FIG. 1 is a diagram illustrating a vehicle grille according to the present disclosure, FIG. 2 is a diagram illustrating a coupling of a grille panel, a lens panel, and a housing of the vehicle grille shown in FIG. 1, FIG. 3 is a diagram illustrating a first form of the present disclosure, FIG. 4 is a diagram illustrating a second form of the present disclosure, FIG. 5 is a diagram illustrating a third form of the present disclosure, FIG. 6 is a diagram illustrating a fourth form of the present disclosure, FIG. 7 is a diagram illustrating a fifth form of the present disclosure, FIG. 8 is a diagram illustrating a sixth form of the present disclosure, and FIG. 9 is a diagram for describing a frame portion forming the housing of the present disclosure. In addition, FIG. 10 is a diagram illustrating a coupling of a grille panel, a lens panel, and a housing of a vehicle grille according to another form of the present disclosure, and FIGS. 11 and 12 are diagrams illustrating a coupling of a grille panel, a lens panel, and a housing of a vehicle grille according to still another form of the present disclosure.

As shown in FIG. 1, a vehicle grille according to the present disclosure includes a grille panel 100 forming a design of the grille; a lens panel 200 disposed in a rear surface of the grille panel 100, formed in the same shape as some or entire area of the grille panel 100, and configured to allow light to propagate in an interior of the lens panel 200 when the light is incident and emit some of the light to the outside; and a housing 300 disposed in a rear surface of the lens panel 200, formed in the same shape as the lens panel 200, and having a coupling provision end portion 310 configured to allow the grille panel 100 to be coupled to a front surface of the lens panel 200 in a state in which the lens panel 200 is coupled to a front surface of the housing 300.

According to the present disclosure, the grille panel 100, the lens panel 200, and the housing 300 are provided from a front side to a rear side of the vehicle, and a cover panel 400 forming a front surface portion of the vehicle may be further provided toward a rear side of the housing 300. Here, a plurality of holes are formed in the grille panel 100 to allow air to circulate from the front surface portion of the vehicle to the inside and outside thereof, and a design of the grille panel 100 may be determined according to the plurality of holes. As shown in the drawing, the holes of the grille panel 100 may be formed not only in a rhombus shape, but also in an irregular shape such as a circle or a polygon according to a desired design.

The lens panel 200 may be mounted on the rear surface of the grille panel 100 and formed in the same shape as some or entire area of the grille panel 100. In addition, the lens panel 200 is configured to allow light to pass therethrough and formed as a light guide in which incident light propagates inward the light guide and some of the incident light is emitted to the outside. Thus, when the lens panel 200 is formed in the same shape as some area of the grille panel 100, light is emitted from some area of the grille panel 100, and, when the lens panel 200 is formed in the same shape as the entire area of the grille panel 100, light is emitted from the entire area of the grille panel 100. This may be determined according to a design factor of the grille panel 100.

The housing 300 mounted on the rear surface of the lens panel 200 is formed in the same shape as the lens panel 200. A light source unit 500 for emitting light to the lens panel 200 may be installed in the housing 300. That is, the housing 300 reflects light propagating toward the rear side of the light emitted from the lens panel 200 to emit the reflected light to the grille panel 100 so that light efficiency is improved.

Consequently, according to the present disclosure, when the light source unit 500 emits light, the light is emitted through the lens panel 200 disposed at the rear side of the grille panel 100 and propagates to spread toward the front side of the grille panel 100 so that the grille panel 100 is further upgraded. In addition, owing to the housing 300, light emission efficiency of the light emitted from the lens panel 200 is provided.

According to the present disclosure, in order to improve convenience of a coupling of the grille panel 100, the lens panel 200, and the housing 300, a coupling provision end portion 310 is formed in the housing 300. The coupling provision end portion 310 is to support a coupling of the rear surface of the grille panel 100 to the front surface of the lens panel 200, and the lens panel 200 is coupled to a front surface of the housing 300 at the front side of the lens panel 200, and the rear surface of the grille panel 100 is coupled to the front surface of the lens panel 200 at the front side thereof through the coupling provision end portion 310 of the housing 300. That is, all of the grille panel 100, the lens panel 200, and the housing 300 may be processed from the front side to the rear side so that work convenience is provided.

Specifically, the grille panel 100, the lens panel 200, and the housing 300 are irradiated with a laser from the front side to the rear side so that the grille panel 100 and the housing 300 may be fused and bonded to the front and rear surfaces of the lens panel 200, respectively. That is, according to the present disclosure, the coupling of the grille panel 100, the lens panel 200, and the housing 300 may be performed through the laser, and the laser is emitted from the front side to the rear side. As described above, since an emission direction of the laser when the grille panel 100 and the lens panel 200 are coupled coincides with an emission direction of the laser when the lens panel 200 and the housing 300 are coupled, complexity of a manufacturing process is reduced and manufacturing convenience is improved.

As shown in FIG. 2, since the lens panel 200 is configured to allow light to pass therethrough, the laser emitted from the front side to the rear side passes through the lens panel 200 to be incident on the front surface of the housing 300. Consequently, the rear surface of the lens panel 200 and the front surface of the housing 300 are fused due to the laser.

Meanwhile, when the grille panel 100 and the lens panel 200 are coupled, the laser should be incident on the rear surface of the grille panel 100. To this end, the housing 300 is provided with the coupling provision end portion 310 which switches a propagation path of the laser so that the laser emitted from the front side to the rear side is reflected by the coupling provision end portion 310 to propagate to the rear surface of the grille panel 100. Consequently, the rear surface of the grille panel 100 and the front surface of the lens panel 200 may be fused due to the laser.

As described above, by using the laser emitted from the front side to the rear side, the grille panel 100 and the housing 300 may be coupled to the front and rear surfaces of the lens panel 200, respectively. Thus, since an emission direction of the laser when the grille panel 100 and the lens panel 200 are coupled coincides with an emission direction of the laser when the lens panel 200 and the housing 300 are coupled, complexity of a manufacturing process is reduced and manufacturing convenience is improved.

As shown in FIG. 2, in the housing 300, a frame portion 320 may be coupled to a rim of the lens panel 200, the coupling provision end portion 310 extends from the frame portion 320, and the coupling provision end portion 310 may be divided into an overlapping section A overlapping the grille panel 100 to the front side and a non-overlapping section B not overlapping the grille panel 100.

As described above, the housing 300 may be formed of the frame portion 320 and the coupling provision end portion 310, and the frame portion 320 and a coupling provision end portion 310 are formed as one piece. The frame portion 320 is coupled to the rear surface of the lens panel 200, and the coupling provision end portion 310 is formed to switch the propagation path of the laser. Here, the coupling provision end portion 310 is divided into the overlapping section A overlapping the grille panel 100 and the non-overlapping section B not overlapping the grille panel 100. That is, in the coupling provision end portion 310, the non-overlapping section B is a space in which the laser emitted from the front side to the rear side is incident, and the overlapping section A is a space in which the laser that is not incident from the outside and has the switched propagation path propagates to the rear surface of the grille panel 100.

Accordingly, the coupling provision end portion 310 may be applied in various examples as follows.

As shown in FIG. 3, according to a first example, the coupling provision end portion 310 obliquely extends from the frame portion 320 to the rear side to form an inclined surface so that a laser incident from the front side may be reflected from the inclined surface to propagate to the rear surface of the grille panel 100.

As described above, the coupling provision end portion 310 of the housing 300 extends from the frame portion 320 toward the rear side in a straight line with an inclination so that, when the laser emitted from the front side to the rear side is incident on the inclined surface, the propagation path of the laser is switched. Here, an inclined angle of the coupling provision end portion 310 is set to allow the incident laser to be incident on the rear surface of the grille panel 100.

Here, in the coupling provision end portion 310, the non-overlapping section B of the inclined surface on which the laser is incident undergoes surface treatment to increase reflectance of a corresponding section. That is, the non-overlapping section B of the coupling provision end portion 310 is formed to increase the reflectance of the corresponding section through aluminum deposition or plating treatment.

Consequently, when an emission position of the laser is fixed so that the laser is emitted from the front side to the rear side and moved toward a lateral side, since the moved position of the laser reflected through the inclined surface of the coupling provision end portion 310 is changed, an incident position of the laser may be adjusted at the rear surface of the grille panel 100.

Meanwhile, as shown in FIG. 4, according to a second example, a portion in which the grille panel 100 is disposed is curved to the rear side so that a bending portion 210 may be formed in the lens panel 200, a fusing portion 110 may be formed in the grille panel 100 to be matched to the bending portion 210 of the lens panel 200 and seated on the bending portion 210, and the coupling provision end portion 310 of the housing 300 may be formed to obliquely extend from the frame portion 320 toward the rear side to allow the laser incident from the front side to propagate to the fusing portion 110 of the grille panel 100.

Consequently, in the grille panel 100, the fusing portion 110 is seated on the bending portion 210 of the lens panel 200 so that a fusing position of the grille panel 100 may be disposed to be closer to the coupling provision end portion 310. Here, the coupling provision end portion 310 of the housing 300 obliquely extends from the frame portion 320 to the rear side so that the propagation path of the laser emitted from the front side to the rear side is switched due to the coupling provision end portion 310. An inclined angle of the coupling provision end portion 310 may be set to allow the incident laser to be incident on the fusing portion 110 of the grille panel 100.

In addition, the bending portion 210 and the fusing portion 110 are formed to extend in a direction perpendicular to a propagation direction of the laser reflected to propagate through the coupling provision end portion 310 so that incident efficiency of the laser is improved. In addition, in the coupling provision end portion 310, the non-overlapping section B on which the laser is incident undergoes surface treatment to increase reflectance of a corresponding section.

Consequently, the laser emitted from the front side to the rear side may be reflected from the inclined surface of the coupling provision end portion 310, may pass through the bending portion 210 of the lens panel 200, and then may be incident on the fusing portion 110 of the grille panel 100. In particular, the fusing portion 110 of the grille panel 100 protrudes toward the coupling provision end portion 310 and extends in a direction perpendicular to an incident direction of the laser so that incidence efficiency of the laser is improved and thus coupling performance between the grille panel 100 and the lens panel 200 is improved.

Meanwhile, as shown in FIG. 5, according to a third example, the coupling provision end portion 310 extends to have a parabolic curve in the frame portion 320 to form a curved surface so that the laser incident from the front side may propagate to the rear surface of the grille panel 100.

As described above, the coupling provision end portion 310 of the housing 300 extends to be curved from the frame portion 320 toward the rear side so that, when the laser emitted from the front side to the rear side is incident on a inclined surface constituting the parabolic curve, the propagation path of the laser is switched. Here, a curvature of the coupling provision end portion 310 is set to allow the incident laser to be incident on the rear surface of the grille panel 100 with a focus.

In addition, in the coupling provision end portion 310, the non-overlapping section B of the curved surface on which the laser is incident undergoes surface treatment to increase reflectance of a corresponding section. That is, the non-overlapping section B of the coupling provision end portion 310 is formed to increase the reflectance of the corresponding section through aluminum deposition or plating treatment.

Consequently, when the laser is emitted from the front side to the rear side to be incident on the coupling provision end portion 310, the propagation path of the laser is moved to the rear surface of the grille panel 100 due to the parabolic shape of the coupling provision end portion 310. In particular, in the coupling provision end portion 310, the focus due to the parabolic shape is set on the rear surface of the grille panel 100 in contact with the front surface of the lens panel 200 so that, even when an emission position of the laser is moved in a lateral direction, the laser is accurately incident on the rear side of the grille panel 100.

Meanwhile, as shown in FIG. 6, according to a fourth example, a portion in which the grille panel 100 is disposed is curved to the rear side so that the bending portion 210 may be formed in the lens panel 200, the fusing portion 110 may be formed in the grille panel 100 to be matched to the bending portion 210 of the lens panel 200 and seated on the bending portion 210, and the coupling provision end portion 310 of the housing 300 may extend to have a parabolic curve from the frame portion 320 toward the rear side and may be formed to be curved to allow the laser incident from the front side to propagate to the fusing portion 110 of the grille panel 100.

Consequently, in the grille panel 100, the fusing portion 110 is seated on the bending portion 210 of the lens panel 200 so that a fusing position of the grille panel 100 may be disposed to be closer to the coupling provision end portion 310. Here, the coupling provision end portion 310 of the housing 300 extends to be curved from the frame portion 320 to the rear side so that the propagation path of the laser emitted from the front side to the rear side may be switched due to the coupling provision end portion 310 and thus the laser may be incident on the rear surface of the grille panel 100. A curvature of the coupling provision end portion 310 may be set to allow the incident laser to be incident on the fusing portion 110 of the grille panel 100.

In addition, the bending portion 210 and the fusing portion 110 are formed to extend in a direction perpendicular to a propagation direction of the laser reflected to propagate through the coupling provision end portion 310 so that incident efficiency of the laser is improved. In addition, in the coupling provision end portion 310, the non-overlapping section B on which the laser is incident may be formed to undergo surface treatment to increase reflectance of a corresponding section.

Consequently, the laser emitted from the front side to the rear side is reflected from the curved surface of the coupling provision end portion 310, passes through the bending portion 210 of the lens panel 200, and then is incident on the fusing portion 110 of the grille panel 100. In particular, the fusing portion 110 of the grille panel 100 protrudes toward the coupling provision end portion 310 and extends in a direction perpendicular to an incident direction of the laser so that incidence efficiency of the laser is improved and thus coupling performance between the grille panel 100 and the lens panel 200 is improved.

Meanwhile, as shown in FIG. 7, according to a fifth example, the coupling provision end portion 310 includes a first reflective end portion 330 located in the non-overlapping section B and extending from the frame portion 320 to the rear side in a straight line with an inclination, and a second reflective end portion 340 located in the overlapping section A and extending from the first reflective end portion 330 to the front side in a straight line with an inclination. Thus, the laser incident from the front side may be reflected by the first reflective end portion 330 to propagate to the second reflective end portion 340 and then reflected by the second reflective end portion 340 to propagate to the rear surface of the grille panel 100.

As described above, the coupling provision end portion 310 of the housing 300 is formed of the first reflective end portion 330 extending toward the rear side with an inclination and the second reflective end portion 340 extending from the first reflective end portion 330 toward the front side with an inclination so that the laser emitted from the front side to the rear side may be reflected from the first reflective end portion 330 to propagate to the second reflective end portion 340 and then reflected from the second reflective end portion 340 again to be incident on the rear surface of the grille panel 100. Here, an inclined angle of the first reflective end portion 330 may be set to allow the incident laser to propagate toward the second reflective end portion 340, and an inclined angle of the second reflective end portion 340 may be set to allow the laser of which the propagation path is moved through the first reflective end portion 330 to be incident on the rear side of the grille panel 100.

The first reflective end portion 330 and the second reflective end portion 340 undergo surface treatment so that reflectance of corresponding sections becomes high. That is, the first reflective end portion 330 and the second reflective end portion 340 may be formed to have high reflectance through aluminum deposition or plating treatment.

Consequently, when an emission position of the laser is moved in the lateral direction in a state of being fixed so as to emit the laser from the front side to the rear side, a propagation position of the laser reflected through the first reflective end portion 330 and the second reflective end portion 340 which form the coupling provision end portion 310 is adjusted so that it is possible to accurately match an incident position of the laser to the rear side of the grille panel 100.

Meanwhile, as shown in FIG. 8, according to a sixth example, the coupling provision end portion 310 includes a first curved end portion 350 located in the non-overlapping section B and extending to have a parabolic curve from the frame portion 320 to the rear side, and a second curved end portion 360 located in the overlapping section A and extending to have a parabolic curve from the first curved end portion 350 to the front side. Thus, the laser incident from the front side may be reflected by the first curved end portion 350 to propagate to the second curved end portion 360 and then reflected by the second curved end portion 360 to propagate toward the rear surface of the grille panel 100.

As described above, the coupling provision end portion 310 of the housing 300 is formed of the first curved end portion 350 extending to be curved toward the rear side and the second curved end portion 360 extending to be curved from the first curved end portion 350 toward the front side so that the laser emitted from the front side to the rear side may be reflected from the first curved end portion 350 to propagate to the second curved end portion 360 and then reflected from the second curved end portion 360 again to be incident on the rear surface of the grille panel 100. Here, a curvature of the first curved end portion 350 may be set to allow the incident laser to propagate toward the second reflective end portion 340, and a curvature of the second curved end portion 360 may be set to allow the laser of which the propagation path is moved through the first curved end portion 350 to be incident on the rear side of the grille panel 100.

The first curved end portion 350 and the second curved end portion 360 undergo surface treatment so that reflectance of corresponding sections becomes high. That is, the first curved end portion 350 and the second curved end portion 360 may be formed to have high reflectance through aluminum deposition or plating treatment.

Consequently, when the laser is emitted from the front side to the rear side to be incident on the first curved end portion 350 forming the coupling provision end portion 310, the laser propagates to the second curved end portion 360 due to a parabolic shape of the first curved end portion 350. In addition, the laser being incident on the second curved end portion 360 propagates to the rear surface of the grille panel 100 due to a parabolic shape of the second curved end portion 360. In particular, a focus of the first curved end portion 350 according to the parabolic shape thereof is set in the second curved end portion 360, and a focus of the second curved end portion 360 according to the parabolic shape thereof is set on the rear surface of the grille panel 100 so that, even when an emission position of the laser is moved in the lateral direction, the laser is accurately incident on the rear surface of the grille panel 100.

Meanwhile, as shown in FIG. 9, one of the frame portions 320 of the housing 300 is formed to have a longer length toward the front side, and, when the lens panel 200 and the housing 300 are coupled, one frame portion 320 extending longer may be coupled to the lens panel 200 and then the other frame portion 320 may be coupled to the lens panel 200.

That is, a pair of the frame portions 320 of the housing 300 is coupled to the lens panel 200 through laser fusing. However, owing to a characteristic of laser fusing, the frame portion 320 on which the laser is incident is melted and thus a length of the frame portion 320 is reduced. Thus, when the frame portions 320 have the same length and one of the frame portions 320 is fused, fusing of the other frame portion 320 is difficult.

Therefore, any one of the frame portions 320 should be formed to have a long length toward the front side. Consequently, when the lens panel 200 and the housing 300 are coupled, the frame portion 320 extending longer is first fused to the lens panel 200 and then the other frame portion 320 is fused to the lens panel 200 so that unstable fusion due to a length deviation is inhibited.

Meanwhile, as shown in FIGS. 1 and 10, the vehicle grille according to the present disclosure includes the grille panel 100 constituting a design of the grille; the lens panel 200 disposed in a rear surface of the grille panel 100, formed in the same shape as some or entire area of the grille panel 100, and configured to allow light to propagate in an interior of the lens panel 200 when the light is incident and emit some of the light to the outside; and a housing 300 disposed in a rear surface of the lens panel 200, formed in the same shape as the lens panel 200, and having a coupling provision hole 370 allowing the grille panel 100 to be coupled to a front surface of the lens panel 200 in a state in which the lens panel 200 is coupled to a front surface of the housing 300.

As described above, according to the present disclosure, in order to improve convenience of a coupling of the grille panel 100, the lens panel 200, and the housing 300, a coupling provision hole 370 is formed in the housing 300. The coupling provision hole 370 is for allowing the rear surface of the grille panel 100 to be coupled to the front surface of the lens panel 200, the lens panel 200 is coupled to the front surface of the housing 300 at the front side of the lens panel 200, and the rear surface of the grille panel 100 is coupled to the front surface of the lens panel 200 at the rear side thereof through the coupling provision hole 370 of the housing 300. Consequently, the grille panel 100 may be coupled to the front surface of the lens panel 200, and the housing 300 may be coupled to the rear surface of the lens panel 200.

Specifically, the grille panel 100, the lens panel 200, and the housing 300 may be fused and coupled due to emission of a laser. Since the lens panel 200 is configured to allow light to pass therethrough, the laser emitted from the front side to the rear side passes through the lens panel 200 to be incident on the front surface of the housing 300. Consequently, the rear surface of the lens panel 200 and the front surface of the housing 300 may be fused due to the laser.

Meanwhile, when the grille panel 100 and the lens panel 200 are coupled, the laser should be incident on the rear surface of the grille panel 100. To this end, the coupling provision hole 370 is formed in the housing 300 so as to allow the laser emitted from the rear side to the front side to be incident on the rear surface of the grille panel 100 so that the rear surface of the grille panel 100 and the front surface of the lens panel 200 may be fused through the laser.

Meanwhile, as shown in FIG. 10, the housing 300 is coupled to the rear surface of the lens panel 200 through a peripheral portion 380 of the coupling provision hole 370, and the grille panel 100 is disposed to face the coupling provision hole 370 of the housing 300 to be coupled to the front surface of the lens panel 200 so that the housing 300 and the grille panel 100 do not overlap each other in a front-rear direction.

As described above, since the grille panel 100 and the housing 300 do not overlap in the lens panel 200 in the front-rear direction, the grille panel 100 and the housing 300 may be easily fused to the lens panel 200 through laser fusing. That is, as can be seen from FIG. 10, when the grille panel 100 is fused to the lens panel 200, a laser emitted from the rear side of the lens panel 200 avoids the housing 300 to be incident on the grille panel 100 so that the grille panel 100 may be fused to the lens panel 200, and, when the housing 300 is fused to the lens panel 200, a laser emitted from the front side of the lens panel 200 avoids the grille panel 100 to be incident on the housing 300 so that the housing 300 may be fused to the lens panel 200.

Meanwhile, as another example, in the housing 300, the peripheral portion 380 of the coupling provision hole 370 may be coupled to the rear surface of the lens panel 200, and the housing 300 and the lens panel 200 may be coupled by an extending end portion 390 which extends from the rear surface of the lens panel 200 toward the peripheral portion 380 of housing 300 or extends from the peripheral portion 380 of housing 300 toward the rear surface of the lens panel 200. Here, the extending end portion 390 may extend from the peripheral portion 380 of the housing 300 to be integrally formed with the housing 300 or may extend from the lens panel 200 to be integrally formed therewith. However, in order to aid understanding of the present disclosure in the following description, it is assumed that the extending end portion 390 is formed in the housing 300.

That is, the extending end portion 390 of the housing 300 coupled to the rear surface of the lens panel 200 is disposed to be spaced in a width direction of the lens panel 200, and the grille panel 100 is disposed between the extending end portions 390 of the housings 300 on the front surface of the lens panel 200 to be coupled to the lens panel 200 so that the grille panel 100 and the housing 300 do not overlap in the front-rear directions based on the lens panel 200. Here, in the housing 300, the extending end portion 390 is formed to be recessed in a side opposite to the lens panel 200, and thus when light propagating in the lens panel 200 propagates to the recessed portion formed through the extending end portion 390, the light is reflected to propagate to the front side so that emission efficiency of the light emitted through the lens panel 200 is provided. In addition, in the lens panel 200, an optics portion 220 formed of a plurality of protrusions or grooves is formed in a portion matching the recessed portion formed by the extending end portion 390, and thus the light is scattered due to the optics portion 220 so that a quantity of light emitted to the front side of the lens panel 200 may be further provided. When the optics portion 220 is formed at a position where the lens panel 200 and the grille panel 100 are in contact with each other or a position where the lens panel 200 and the housing 300 are in contact therewith, the optics portion 220 may act as a fusion inhibiting factor so that it is preferable that the optics portion 220 is formed in only the recessed portion between the extending end portions 390.

The vehicle grille formed of the above described structure allows light to be turned on in the grille of the vehicle and to be softly spread from the rear side of the grille so that the grille is upgraded. In addition, the ease of a coupling of the grille panel 100, the lens panel 200, and the housing 300 forming the grille is provided so that work convenience and productivity are improved.

Although the specific forms of the present disclosure have been described and illustrated, those skilled in the art will appreciate that various alternations and modifications are possible without departing from the technical spirit of the present disclosure provided in the appended claims.

What is claimed is:

1. A vehicle grille, comprising:
a grille panel;
a lens panel disposed at a rear side of the grille panel, and formed in a same shape as some or entire area of the grille panel, wherein when a light is incident, the lens panel is configured to allow some of the light to propagate in the lens panel and emit some of the light to an outside of the lens panel; and
a housing disposed on a rear surface of the lens panel, formed in a same shape as the lens panel, and including a coupling provision end portion configured to reflect a laser emitted from a front side of the lens panel to a rear surface of the grille panel such that a front surface of the lens panel is coupled to the rear surface of the grille panel by the laser,
wherein the rear surface of the lens panel and a front surface of the housing are coupled to each other.

2. The vehicle grille of claim 1, wherein the grille panel is coupled to the front surface of the lens panel and the housing is coupled to the rear surface of the lens panel.

3. The vehicle grille of claim 2, wherein the housing further comprises a frame portion coupled to a rim of the lens panel,
wherein the coupling provision end portion extends from the frame portion, and is divided into an overlapping section which overlaps the grille panel and a non-overlapping section which does not overlap with the grille panel.

4. The vehicle grille of claim 3, wherein the coupling provision end portion obliquely extends from the frame portion to a rear side and forms an inclined surface, and the laser emitted from the front side of the lens panel is reflected through the inclined surface and propagates to the rear surface of the grille panel.

5. The vehicle grille of claim 4, wherein, in the coupling provision end portion, the non-overlapping section of the inclined surface on which the laser is incident is surface treated and has higher reflectance.

6. The vehicle grille of claim 3, wherein:
the lens panel includes a bending portion in which the grille panel is disposed is curved to the rear side;
the grille panel includes a fusing portion matched to and seated on the bending portion; and
the coupling provision end portion of the housing obliquely extends from the frame portion to the rear side and is obliquely formed to allow the laser incident from the front side to propagate to the fusing portion of the grille panel.

7. The vehicle grille of claim 3, wherein the coupling provision end portion extends and has a parabolic curve in the frame portion to form a curved surface, and
the laser incident from the front side propagates toward the rear side of the grille panel.

8. The vehicle grille of claim 7, wherein, in the coupling provision end portion, the non-overlapping section of the curved surface on which the laser is incident is surface treated and has a higher reflectance than an untreated portion.

9. The vehicle grille of claim 3, wherein:
the lens panel includes a bending portion in which the grille panel is disposed is curved to the rear side;
the grille panel includes a fusing portion matched to and seated on the bending portion; and
the coupling provision end portion of the housing extends and has a parabolic curve from the frame portion to the rear side, and is obliquely formed to allow the laser incident from the front side to propagate to the fusing portion of the grille panel.

10. The vehicle grille of claim 3, wherein the coupling provision end portion includes:
a first reflective end portion located in the non-overlapping section and configured to extend from the frame portion to the rear side in a straight line with an inclination; and
a second reflective end portion located in the overlapping section and configured to extend from the first reflective end portion to the front side in a straight line with an inclination,
wherein the laser incident from the front side is reflected by the first reflective end portion and propagate to the second reflective end portion, and is then reflected by the second reflective end portion and propagate to the rear surface of the grille panel.

11. The vehicle grille of claim 10, wherein the first reflective end portion and the second reflective end portion are surface treated and have higher reflectance than an untreated portion.

12. The vehicle grille of claim 3, wherein the coupling provision end portion includes:
a first curved end portion located in the non-overlapping section and configured to extend and have a parabolic curve from the frame portion to the rear side; and
a second curved end portion located in the overlapping section and configured to extend and have a parabolic curve from the first curved end portion to the front side,
wherein the laser being incident from the front side is reflected by the first curved end portion and propagate to the second curved end portion, and then is reflected by the second curved end portion and propagate to the rear surface of the grille panel.

13. The vehicle grille of claim 12, wherein the first curved end portion and the second curved end portion are surface treated and have higher reflectance than an untreated portion.

14. The vehicle grille of claim 2, wherein the housing comprises a plurality of frame portions,
wherein a first frame portion of the plurality of frame portions extends further to the front side than a second frame portion of the plurality of frame portions, and, when the lens panel and the housing are coupled, the first frame portion is first coupled to the lens panel, and then the second frame portion is coupled to the lens panel.

* * * * *